United States
Kurschner

[11] 3,818,471
[45] June 18, 1974

[54] SEISMIC INTRUSION LINE SENSOR
[75] Inventor: Dennis L. Kurschner, Minnetonka, Minn.
[73] Assignee: Honeywell Inc., Minneapolis, Minn.
[22] Filed: June 14, 1972
[21] Appl. No.: 262,888

[52] U.S. Cl. .............................. 340/261, 181/.5 TS
[51] Int. Cl. ...................... G08b 13/02, G08b 21/00
[58] Field of Search ...... 340/261, 258 B, 421, 18 P, 340/15.5 TN; 181/.5 TS

[56] References Cited
UNITED STATES PATENTS
3,585,581  6/1971  Aune et al. ........................ 340/261
3,665,445  5/1972  Riley, Jr. ............................. 340/261
3,686,658  8/1972  Wilt .................................... 340/261

Primary Examiner—John W. Caldwell
Assistant Examiner—Marshall M. Curtis
Attorney, Agent, or Firm—Charles J. Ungemach; Albin Medved

[57] ABSTRACT

A seismic intrusion line sensor system comprised of three pairs of geophones positioned along a predetermined line. The output signals of the two geophones in each pair are processed to provide a signal indicative of the difference in the number of threshold crossings of the two geophone signals. These difference signals are then integrated over a period of time to provide a signal indicative of the seismic disturbance which is the cause of the unbalance in the signals generated by the various geophones. When two of the three pairs indicate signal unbalance, a local seismic disturbance is identified.

11 Claims, 18 Drawing Figures

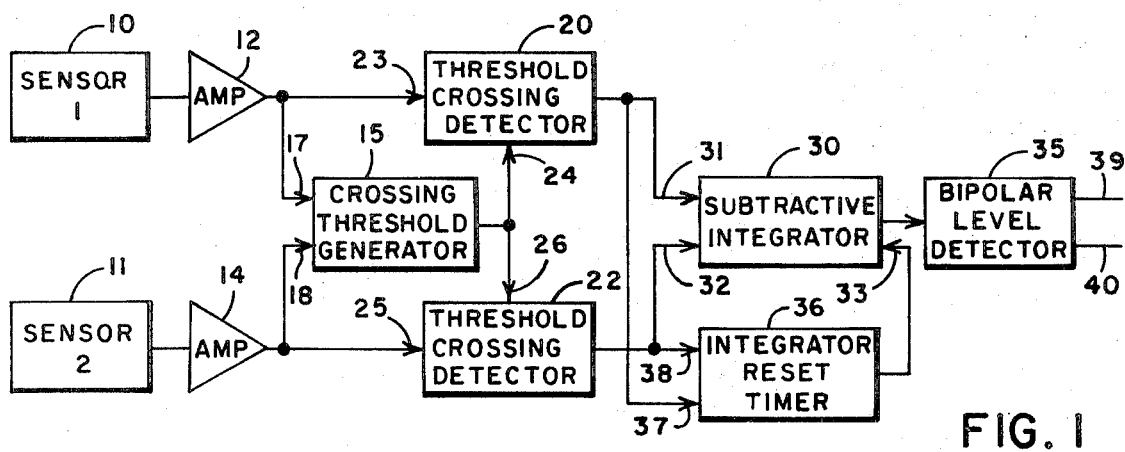
FIG. 1
FIG. 4A
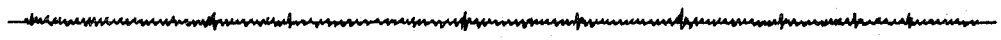
FIG. 4B
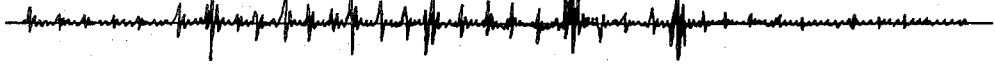
FIG. 4C
FIG. 5A
FIG. 5B
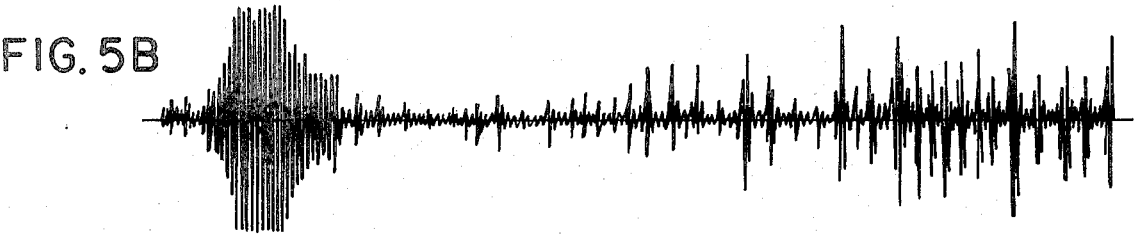
FIG. 5C
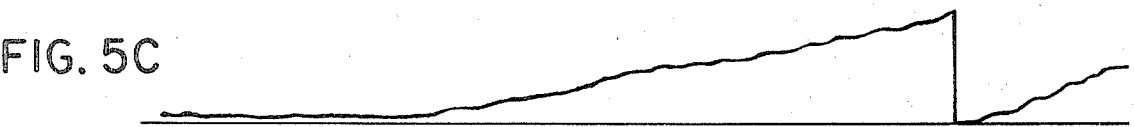

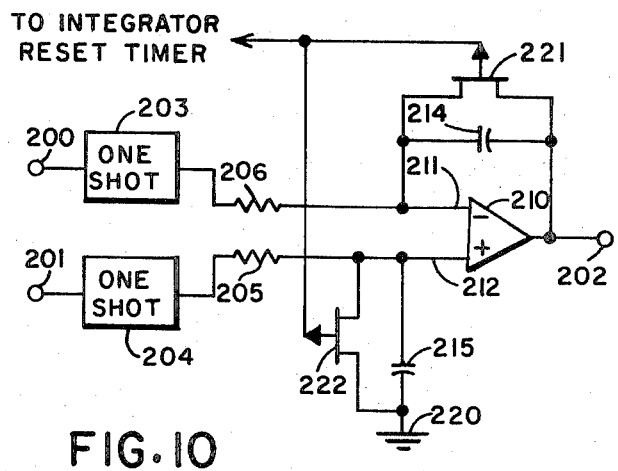
FIG. 10
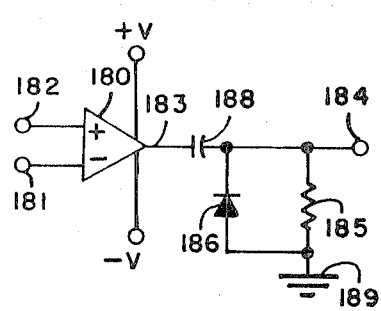
FIG. 9
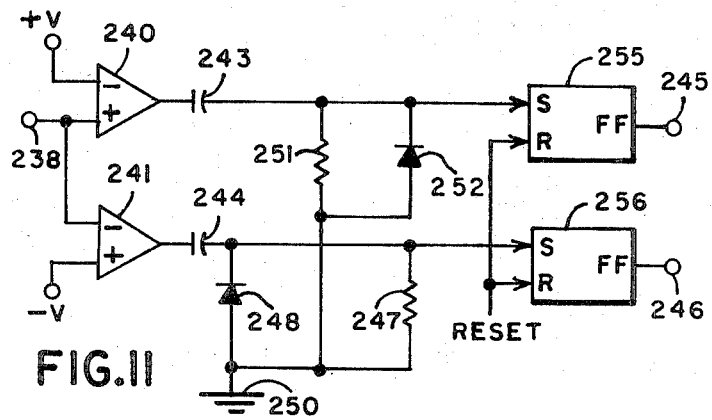
FIG. 11
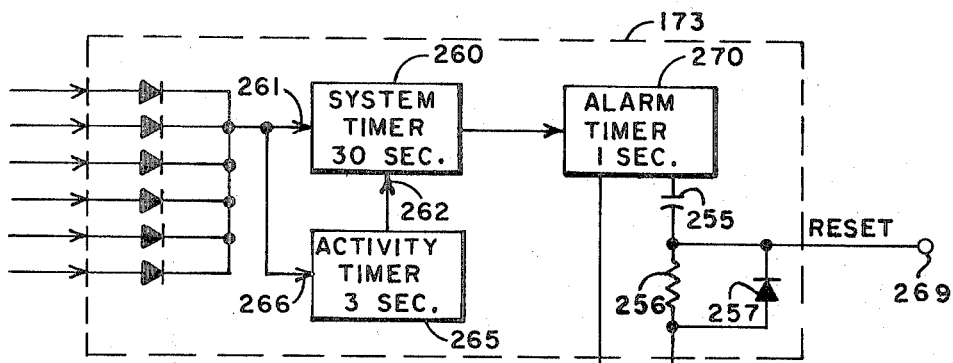
FIG. 12
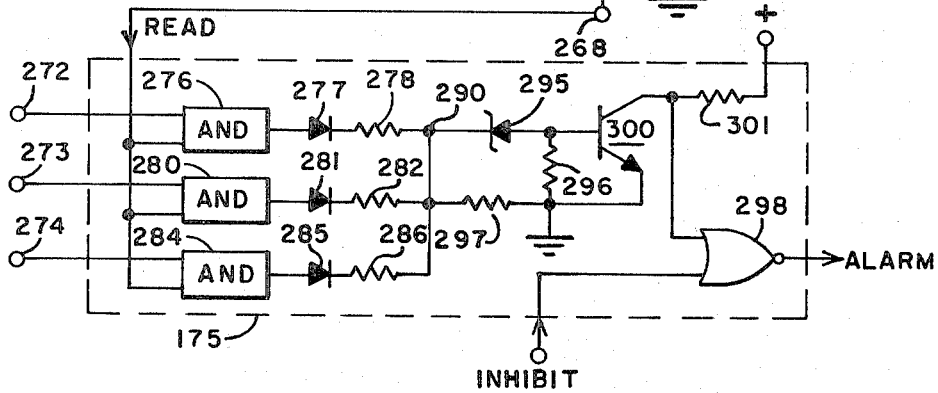

SEISMIC INTRUSION LINE SENSOR

BACKGROUND OF THE INVENTION

1. Field of the Invention

The invention relates to intrusion detection systems. Particularly, it relates to intrusion systems which utilize seismic point sensors, such as geophones, as the disturbance detectors. A plurality of point sensors are used to identify the crossing of the line.

2. Description of the Prior Art

In prior art, the amplitude of the signal generated by a geophone or other seismic sensor, is generally used to detect an intrusion across a line into a protected area. Conventional seismic arrays use the amplitude difference of the signals from various sensors in the area to determine when an intruder may be crossing the line. The array of that type works satisfactorily only under special conditions, and fails especially when the signal from the disturbance is large. When the signal is large, all sensors tend to saturate and any signal amplitude difference between sensors disappears or becomes meaningless. Furthermore, far-field disturbances may at times cause amplitude differences which will appear to meet target criteria.

SUMMARY OF THE INVENTION

In the present invention, the system is comprised of a plurality of pairs of seismic transducers, such as geophones. It differs from the prior art in that it does not relay solely on the amplitude of the disturbance sensed by the individual point sensors, but it rather takes advantage of the fact that the signal attenuation is a function of the distance from the point of disturbance to the sensor. The attenuation of the higher frequencies is greater than that of the lower frequencies and as a result the point sensors nearest the disturbance are receiving a frequency spectrum which is richer on the high frequency end than the signals received by point sensors further away. The present system recognizes this phenomena and utilizes it as the main criteria in the processing of the signal. The amplitude of the signals is used also, but it is used only to enhance the signal derived from the frequency differential. Generally, of course, the point sensor nearest the disturbance receives a signal which not only contains the higher frequencies, but also is of higher amplitude.

The specific embodiment of the invention disclosed herein operates on a "threshold crossing perturbation" as the detection criteria. Since signals of higher frequency are crossing the threshold reference a greater number of times in any given time span, the number of such threshold crossings is a function of the disturbance proximity to the sensor.

Taking any pair of sensors in a line array, during the time when no disturbances are present, the number of threshold crossings for each of them will be approximately equal and the difference between them will be close to zero. However, if some target approaches into the field of influence of the sensor line array, the signal from each sensor will contain a wide range of threshold crossing rates due to the close proximity of the source of disturbance. If the source of disturbance is nearer one sensor of a pair than the other, the threshold crossing rates seen by the two sensors will clearly differ due to the unequal attenuation of the signals. As a result, the difference in the number of crossings for the two sensors will be greatly different from zero, irregardless of the signal amplitude.

By using three pairs of sensors, it is impossible to cross the line at any point without unbalancing at least two pairs of the three sensor pairs, since if the disturbance occurs exactly between the sensors of one pair, it will be displaced substantially from the midpoint of each of the other two pairs.

An additional feature of the preferred embodiment of the present invention is the use of a crossing threshold which is not a true zero but is somewhat a function of the amplitude of the signals received by the sensors. This feature, as will be explained later in the specification, clearly enhances the signal obtained from the sensor array. Particularly, it makes it virtually impossible for an intruder to penetrate across the line without being detected.

It is therefore an object of the present invention to provide a seismic intrusion line sensor of increased sensitivity.

A further object of the present invention is to provide a seismic line sensor which utilizes the signal frequency characteristics as the criteria for detecting the crossing of a predetermined line.

These and further objects will become apparent to those skilled in the art upon inspection of the drawings, specification, and claims which form a part hereof.

BRIEF DESCRIPTION OF THE DRAWINGS

FIG. 1 is a block diagram of a preferred embodiment of the present invention using a single pair of seismic point sensors;

FIGS. 4A and 4B are graphical representations of the outputs of a pair of seismic point sensors in response to a man crossing the line defined by the two sensors;

FIG. 4C illustrates the signal appearing at the output of the subtractive integrator of FIG. 1 in response to the occurrence of signals depicted in FIGS. 4A and 4B;

FIGS. 5A and 5B represent outputs of a pair of seismic point sensors in response to a distant explosion followed by a walking man crossing the line defined by the two sensors;

FIG. 5C illustrates the output of the subtractive integrator of FIG. 1 in response to disturbances represented by signals of FIGS. 5A and 5B;

FIG. 9 is a schematic circuit representative of a threshold crossing detector used in the preferred embodiment of the present invention;

FIG. 10 is a schematic circuit diagram of a subtractive integrator used in the preferred embodiment of the present invention;

FIG. 11 is a schematic diagram of a bipolar level detector used in the preferred embodiment of the present invention; and FIG. 12 is schematic diagram of a system activity timer and a two-of-three detector used in the preferred embodiment of the present invention as shown in FIG. 7.

DESCRIPTION OF THE PREFERRED EMBODIMENTS

Figure 2:
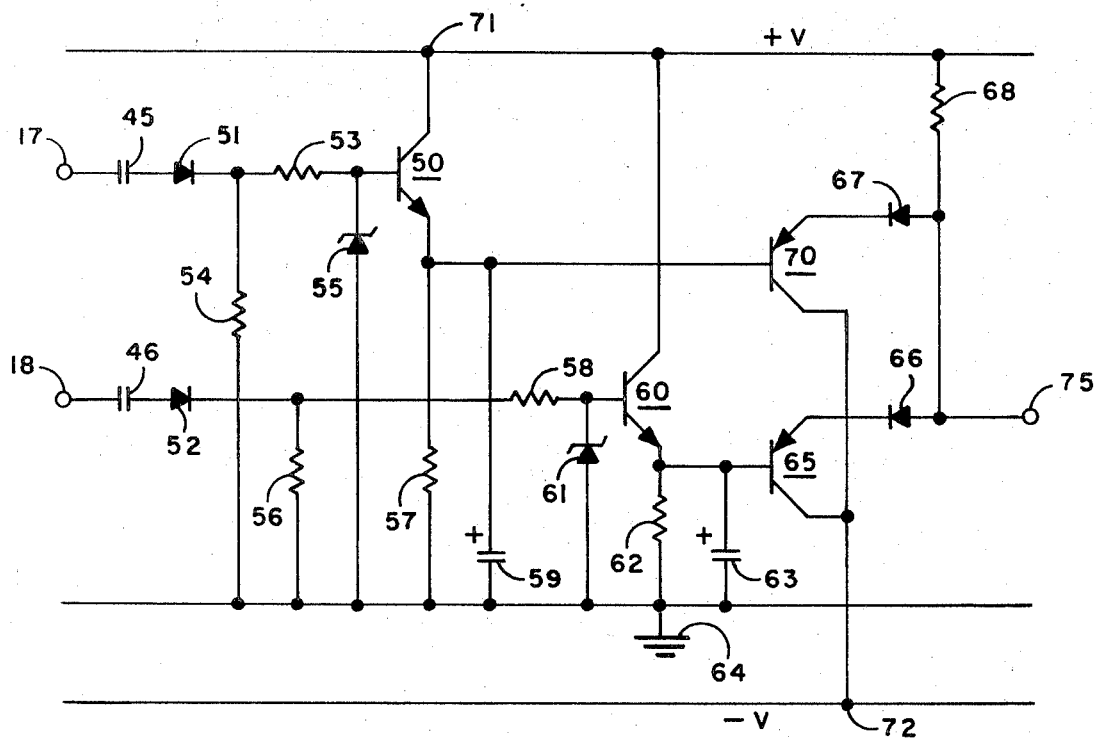
FIG. 2 is a schematic diagram of a crossing threshold generator for use in embodiments of FIG. 1 and FIG. 7.

Referring to FIG. 1, an embodiment of the present invention is shown wherein a single pair of seismic sensors 10 and 11 are utilized. Sensors 10 and 11 are point sensors, such as geophones, which are responsive to displacement. The output of sensor 10 is connected to the input of a high gain amplifier 12 and the output of sensor 11 is connected to the input of a high gain amplifier 14. The signals from amplifiers 12 and 14 are applied, respectively, to inputs 17 and 18 of a crossing threshold generator 15. A pair of threshold crossing detectors 20 and 22 are provided, threshold crossing detector 20 having an input 23 connected to the output of amplifier 12 and an input 24 connected to the output of crossing threshold generator 15. Threshold crossing detector 22 has an input 25 connected to the output of amplifier 14 and an input 26 connected to the output of crossing threshold generator 15. The outputs of threshold detectors 20 and 22 are applied respectively to inputs 31 and 32 of a subtractive integrator 30, which has an output connected to a bipolar level detector 35. An integrator reset timer 36 has a pair of inputs 37 and 38 connected to the outputs of threshold detectors 20 and 22, respectively. The output of integrator reset timer 36 is connected to an input 33 of subtractive integrator 30. Bipolar level detector 35 has two outputs 39 and 40.

The signals detected by sensors 10 and 11 will be in response to a seismic disturbance in the vicinity of the sensors. During the periods of relative calm, the sensors will detect and generate a signal of low amplitude and relatively low frequency. Generally, this signal will be below the threshold adopted for the circuit of FIG. 1. Far-field disturbance will contain similar low frequency components, because of the inherent attenuation characteristics of the soil which tends to filter out the higher frequencies and tends to propagate signals of lower frequency. Localized disturbances, on the other hand, which originate in the proximity of the sensors will not undergo significant attenuation of the higher frequencies by the time the signal reaches the sensor. Thus, as a localized disturbance in the vicinity of the sensor occurs, the sensor will generate an output signal of relatively high amplitude, as well as relatively high frequency. The high frequency can be interpreted by the apparatus of the present invention as an increased number of crossings of the signal with respect to a predetermined threshold level. The detection of a localized disturbance can be made by counting the number of such threshold crossings within a predetermined period of time. This is the feature upon which the operation of the present invention primarily relies. The signal amplitude variation, although not directly taken as determinative of the disturbance, is used in generating the threshold with respect to which crossings are sensed. Since the number of threshold crossings is the determinative information, the large amplitude signals caused by large disturbances far away from the sensors will be easily distinguished because they contain only the lower frequency components, therefore resulting in fewer threshold crossings.

Figure 3:
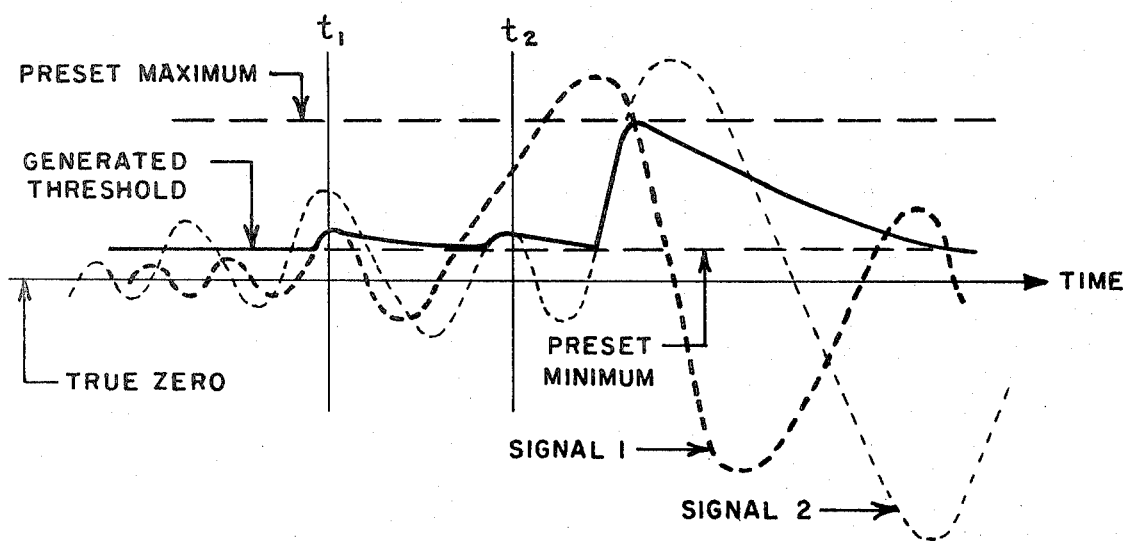
FIG. 3 illustrates graphically a typical signal appearing at the output of crossing threshold generator of FIG. 2.

The signals generated by sensors 10 and 11 are amplified by amplifiers 12 and 14, respectively. The amplified signals are combined in crossing threshold generator 15 to generate a threshold signal, such as illustrated in FIG. 3. A threshold generator, designed specifically for use in the preferred embodiment of the present invention, is illustrated in FIG. 2 and will be discussed in more detail later in the specification.

The signals from amplifier 12 and crossing threshold generator 15 are applied to threshold crossing detector 20. At the output of threshold crossing detector 20 will appear a plurality of pulses, each representing a crossing of the threshold by the signal from amplifier 12. Similarly, the output signals from amplifier 14 and crossing threshold generator 15 are applied to threshold crossing detector 22, at the output of which will appear a plurality of pulses indicative of the crossing of the threshold by the signal from amplifier 14. The threshold crossing detector is essentially a high gain operational amplifier connected as a differential detector. Typically, an operational amplifier has an inverting input, a non-inverting input, and an output.

FIG. 9 illustrates a threshold crossing detector used in the preferred embodiment of the present invention. The output of the crossing threshold generator (15 of FIG. 1) is applied to inverting input 181 of an operational amplifier 180. Amplifier 180 further has a non-inverting input 182, to which is applied the amplified signal from a sensor, as, for example at 23 of FIG. 1. Output 183 of amplifier 180 is coupled to a terminal 184 through a capacitor 188. A diode 186 is connected for positive current flow from a ground terminal 189 to terminal 184, thereby allowing a signal to appear at terminal 184 only when the signal applied to non-inverting input 182 is more positive than the threshold signal applied to inverting input 181.

Referring again to FIG. 1, the digital outputs of threshold crossing detectors 20 and 22 are subtracted and integrated in subtractive integrator 30. The output of subtractive integrator 30 will be an analog signal whose amplitude will be a function of the difference in the number of pulses generated by the two threshold crossing detectors over a predetermined period of time. The predetermined period of time is measured by intergrator reset timer 36. A ONE-SHOT with a time period of about 60 seconds has been used in the preferred embodiment. Timer 36 has its inputs connected to the outputs of threshold crossing detectors 20 and 22 and is activated by the presence of an output signal at either of the two threshold crossing detectors 20 and 22. Periodically, the integrator reset timer 36 provides an output signal which resets subtractive integrator 30. The analog signal generated by subtractive integrator 30 will be positive or negative, depending upon whether the disturbance is nearer one or the other of the two seismic sensors of the pair.

FIG. 10 illustrates the subtractive integrator used in the preferred embodiment of the present invention. It is shown having a pair of inputs 200 and 201 and an output 202. Input 200 is connected to the input of a ONE-SHOT 203, the output of which is connected to an inverting input 211 of an operational amplifier 210 through a resistor 206. Input 201 is similarly connected to an input of a ONE-SHOT 204, the output of which is connected to a non-inverting input 212 of operational amplifier 210 through a resistor 205. The output of operational amplifier 210 is connected directly to output 202 of the subtractive integrator. A capacitor 214 is connected between the output of operational amplifier 210 and its inverting input 211. A capacitor 215 is connected between the non-inverting input 212 of operational amplifier 210 and the ground potential terminal 220. Semiconductor switches 221 and 222, in the preferred embodiment identified as field effect transistors, are connected respectively across capacitors 214 and 215 to allow resetting of the integrator upon application of a reset signal to their control terminals. The reset signal is provided by an integrator reset timer shown at 36 in FIG. 1. In the preferred embodiment, ONE-SHOTS 203 and 204 have been selected to have a time constant of 8 milliseconds.

When a threshold crossing is detected, pulses are applied to ONE-SHOTS 203 and 204. Single shot pulses are then fed to the inputs of amplifier 210. The subtractive integrator simultaneously subtracts the two inputs and continuously sums the result. Hence, if both inputs see the same train of pulses, the output of the integrator remains at zero. If the train of pulses is fed to either input alone, the integrator pulse is a positive or negative going ramp.

FIG. 4 depicts graphically the operation of the present invention. FIGS. 4A and 4B are graphical representations of the outputs of a pair of geophones in response to disturbances caused by one man crossing at two feet per second the line defined by the two sensors. It is noted that the crossing of the line occurred nearer the location of the geophone whose output is represented by FIG. 4B. As a result, FIG. 4B, not only shows a signal of higher amplitude than that of 4A, but also oscillations of higher frequency. The signal of FIG. 4B therefore results in a large number of threshold crossings and the output of the subtractive integrator is a ramp of the type shown in FIG. 4C. The subtractive integrator is reset periodically to prevent saturation.

To illustrate the far-field rejection capability of the intrusion detector according to the present invention, FIG. 5 illustrates an actual measurement of a distant explosion followed by one man crossing the line at four feet per second. It will be noted in FIGS. 5A and 5B that the distant explosion produced a signal of high amplitude in both geophones of the pair. However, the output of the subtractive integrator remained substantially zero. When this distant explosion was followed by the man crossing the line of the two sensors at four feet per second, the output of the subtractive integrator is a ramp clearly indicating that a crossing occurred. The geophone producing the signal illustrated in FIG. 5B was closer to the point at which the crossing occurred.

Figure 6A:
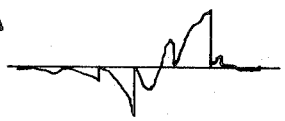
FIGS. 6A, 6B, and 6C represent the output of the subtractive integrator of FIG. 1 in response to various disturbances detected by a pair of seismic point sensors.
Figure 6B:
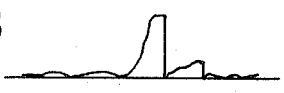
Figure 6C:
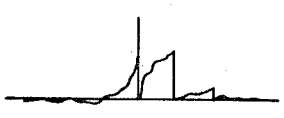

FIG. 6 illustrates the types of output generated by the subtractive integrator in response to different types of disturbances. FIG. 6A results from a vehicle traveling 15 miles per hour parallel to the line and 75 feet away. As the vehicle nears the sensor pair, the disturbance is first unbalanced towards one geophone, and as the vehicle travels further, the unbalance shifts to the other geophone of the pair. The resulting signal signature, therefore, is a signal of a first polarity followed by a signal of a second polarity. FIG. 6B represents one man crossing the line at 2 feet per second. The resulting signal is a single polarity disturbance, the polarity depending upon which geophone of the pair the disturbance was more proximate to. FIG. 6C is similar to that of 6B, but showing a signal produced by one man crossing the line at 4 feet per second.

In the highly improbable possibility that the disturbances will occur precisely at midpoint between the two sensors, it is possible for the output of subtractive integrator 30 to be zero, in spite of the fact that the disturbance occurred. The preferred embodiment of the present invention takes care of such a possibility by utilizing three pairs of seismic sensors arranged along a predetermined line. The arrangement in the preferred embodiment is such that, if the sensors are numbered consecutively from 1 to 6, sensors number 1 and 4 form a first pair, sensors number 2 and 5 form a second pair, and sensors number 3 and 6 form a third pair. With this arrangement, which is further discussed with reference to FIG. 7, it is impossible to cross the line without unbalancing at least two pairs of sensors.

Referring now to FIG. 2, a crossing threshold generator is illustrated having a pair of inputs 17 and 18. Input 17 is connected to one side of a capacitor 45 the other side of which is connected to the anode of a diode 51. The cathode of diode 51 is connected to the base of a transistor 50 through a resistor 53 and is further connected to a ground terminal 64 through a resistor 54. The collector of transistor 50 is connected directly to a positive potential terminal 71, while its emitter is connected to ground terminal 64 through a parallel combination of a resistor 57 and a capacitor 59 and is further connected directly to the base of a transistor 70. A zener diode 55 is connected between the base of transistor 50 and ground potential terminal 64 such that the forward current flow is from ground terminal 64 to the base of transistor 50.

Terminal 18 is connected to one side of a capacitor 46, the other side of which is connected to the anode of a diode 52. The cathode of diode 52 is connected to the base of a transistor 60 through a resistor 58 and to ground terminal 64 through a resistor 56. The collector of transistor 60 is connected directly to positive potential terminal 71 and the emitter of transistor 60 is connected to ground potential terminal 64 through a parallel combination of a resistor 62 and a capacitor 63 and is further connected directly to the base of transistor 65. A zener diode 61 is connected between the base of transistor 60 and ground potential terminal 64 in such a way that the forward flow is from ground terminal 64 to the base of transistor 60.

The emitter of transistor 70 is connected directly to the cathode of a diode 67, the anode of which is connected directly to an output terminal 75. A resistor 68 is connected between output terminal 75 and positive potential terminal 71. The emitter of transistor 65 is similarly connected to the cathode of a diode 66, the anode of which is connected to output terminal 75. The collector electrodes of transistors 65 and 70 are connected to each other and to a negative potential terminal 72.

The operation of the crossing threshold generator of FIG. 2 will be easily understood by those skilled in the art. Its understanding will be facilitated by reference to FIG. 3, which illustrates the resulting output signal upon application of signals 1 and 2 at inputs 17 and 18.

The resulting threshold signal is the instantaneous minimum of one of three values, but never less than a preset minimum. The three values are the RC decayed, peak detected, signal applied at input 17, the RC decayed, peak detected, signal applied at input 18, and a preset maximum. In FIG. 3, at time $t_1$, signal 1 is the minimum of the three values called out above. At time $t_2$, signal 2 is the minimum and the threshold follows the minimum. It will follow the minimum until it reaches a preset maximum, which it is not allowed to cross. The threshold signal follows the minimum signal when it is increasing. When it is decreasing, the threshold signal follows a RC decayed exponential. The resulting threshold signal is depicted by the solid line in FIG. 3.

Figure 7:
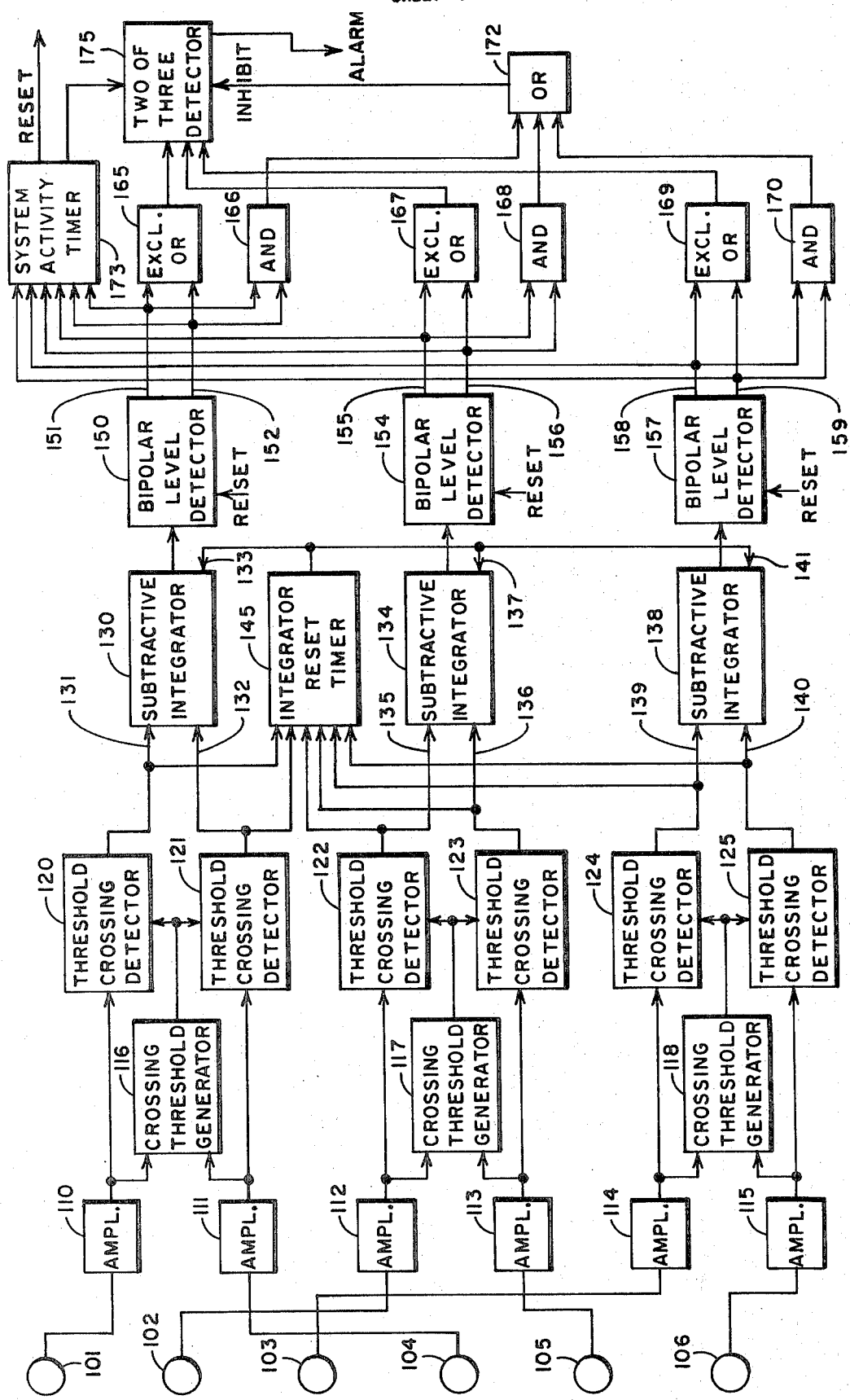
FIG. 7 illustrates in block diagram form a preferred embodiment of the present invention wherein three pairs of seismic point sensors are arranged in a line array.

In FIG. 7 is shown the preferred embodiment of the present invention, wherein six seismic point sensors are used in the manner alluded to previously. Sensors 101 through 106 are shown having their outputs connected, respectively, to amplifiers 110 through 115. Sensors 101 and 104 form a first pair, sensors 102 and 105 form a second pair, and sensors 103 and 106 form a third pair. The signals from each pair of the sensors are processed in the manner described previously with reference to FIG. 1.

The output of amplifier 110 is connected to the input of a threshold crossing detector 120 (see FIG. 9) and also to an input of a crossing threshold generator 116 (see FIG. 2). The output of amplifier 111 is connected to a second input of crossing threshold generator 116 and to the input of a threshold crossing detector 121. The outputs of threshold crossing detectors 120 and 121 are connected respectively to inputs 131 and 132 of a subtractive integrator 130 (see FIG. 10). Subtractive integrator 130 further has a reset input 133 and an output.

The outputs of amplifiers 112 and 113 are connected respectively to the first inputs of threshold crossing detectors 122 and 123 and are further connected to the inputs of a crossing threshold generator 117. The output of crossing threshold generator 117 is connected to second inputs of each of threshold crossing detectors 122 and 123. Threshold crossing detectors 122 and 123 have their outputs connected respectively to inputs 135 and 136 of a subtractive integrator 134. Subtractive integrator 134 further has a reset input 137 and an output.

The output of amplifiers 114 and 115 are connected, respectively, to first inputs of threshold crossing detectors 124 and 125 and are further connected to the inputs of a crossing threshold generator 118. Crossing threshold generator 118 has its output connected to the second inputs of each of said threshold crossing detectors 124 and 125. The outputs of threshold crossing detectors 124 and 125 are connected to inputs 139 and 140 of a subtractive integrator 138. Subtractive integrator 138 further has a reset input 141 and an output.

An integrator reset timer 145 is provided with a plurality of inputs, one of said inputs being connected to each of the outputs of threshold crossing detectors 120 through 125, and has an output connected to reset inputs 133, 137, and 141 of the subtractive integrators. In the preferred embodiment, the integrator reset timer is a ONE-SHOT with a 60 second time constant.

A bipolar level detector 150 is provided with an input connected to the output of subtractive integrator 130 and a pair of outputs 151 and 152. A bipolar level detector 154 is provided with an input connected to the output of subtractive integrator 134 and outputs 155 and 156. Finally, a bipolar level detector 157 is provided with an input connected to the output of subtractive integrator 138 and a pair of outputs 158 and 159. The function of a bipolar level detector is to provide a signal at a first output when the input signal is positive and a signal at a second output when the input signal is negative. Each of the bipolar level detectors is further provided with a reset input.

A typical construction of a bipolar level detector is illustrated in FIG. 11. It is comprised of a pair of operational amplifiers 240 and 241 which are connected as differential detectors. The signal, whose polarity is to be detected, is applied to a terminal 238 which is connected directly to the non-inverting input of operational amplifier 240 and the inverting input of operational amplifier 241. The inverting input of amplifier 240 is connected to a positive threshold potential, while the non-inverting input of amplifier 241 is connected to a negative threshold potential. In the preferred embodiment, the threshold potentials are set at plus and minus 300 millivolts, respectively.

The output of amplifier 240 is connected to SET input of a FLIP-FLOP 255 through a capacitor 243, and the output of amplifier 241 is connected to SET input of a FLIP-FLOP 256 through a capacitor 244. A parallel combination of a resistor 247 and a diode 248 is connected between a ground terminal 250 and SET input of FLIP-FLOP 256 and a parallel combination of a resistor 251 and a diode 252 is connected between ground terminal 250 and SET input of FLIP-FLOP 255. Diodes 248 and 252 are connected for forward current flow from ground terminal 250 to SET inputs of FLIP-FLOPS 255 and 256, respectively. FLIP-FLOP 255 and FLIP-FLOP 256 further each have a RESET input and an output. The output of FLIP-FLOP 255 is connected to a terminal 245 and the output of FLIP-FLOP 256 is connected to a terminal 246. An application of a positive signal at input 238, exceeding the 300 millivolt threshold, will produce a positive signal at terminal 245 and will not produce any signal at terminal 246. A negative signal at input terminal 238, on the other hand, which exceeds the 300 millivolt threshold, will produce a positive signal at terminal 246, while producing no signal at terminal 245. When both positive and negative signals appear at input terminal 238 in fairly close succession, positive signals will appear at both terminals 245 and 246.

Referring again to FIG. 7, the two outputs of bipolar level detector 150 are applied to inputs of an EXCLUSIVE OR logic circuit 165, as well as the inputs of an AND gate 166. The outputs of bipolar level detector 154 are connected to the inputs of an EXCLUSIVE OR gate 167 and to the inputs of an AND gate 168. The two outputs of bipolar level detector 157 are applied to the inputs of an EXCLUSIVE OR gate 169 and to the inputs of an AND gate 170. EXCLUSIVE OR gates 165, 167, and 169 each have an output connected respectively to one of three inputs of a two-of-three detector 175, the output of which provides a signal representative of a valid intrusion across the predetermined line. The output of AND gates 166, 168, and 170 are applied respectively to one of three inputs of an OR gate 172. The output of OR gate 172 is applied to the two-of-three detector 175 to inhibit its operation whenever the output of any one of the bipolar level detectors detects both a positive and a negative polarity.

A system activity timer 173 is provided with six inputs, each of the inputs connected to one of the outputs of bipolar level detectors 150, 154, and 157. A first output of system activity timer 173 is applied to two-of-three detector 175 to commence the operation of detector 175 whenever activity is indicated at any one of the bipolar level detector outputs. A second output of system activity timer 173 is applied to RESET inputs of bipolar level detectors 150, 154, and 157. The structure of two-of-three detector 175 and system activity timer 173 will be described in further detail with reference to FIG. 12.

Figure 8:
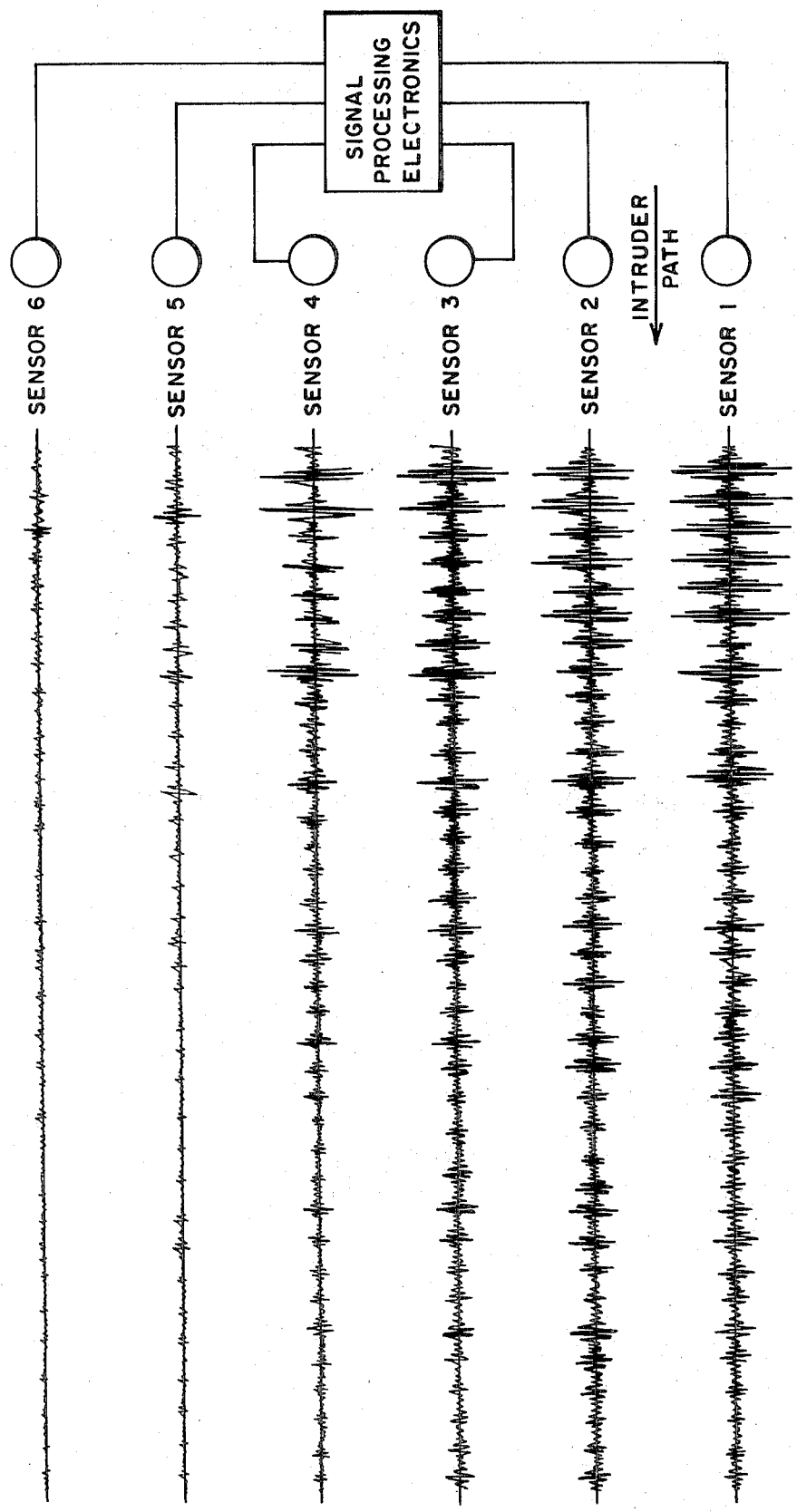
FIG. 8 illustrates typical signals generated by seismic point sensors of FIG. 7 in response to a localized disturbance.

Reference to FIG. 8 will be helpful towards the understanding of the operation of the apparatus disclosed in FIG. 7. Illustrated in FIG. 8 are typical output signals generated by the six seismic sensors in a line array in response to an intrusion across the line defined by the array along an intruder path indicated between sensors 1 and 2. Clearly, the outputs of sensors 1 and 2 are of the highest amplitude and, although it is difficult to ascertain from the graph of FIG. 8, the signals generated by sensors 1 and 2 contain a larger proportion of higher frequencies. The outputs of sensors 3, 4, 5, and 6 are progressively diminished in amplitude. Furthermore, since the source frequencies attenuate down to the major frequency of propagation for the particular soil, the outputs of these latter four sensors contain a progressively lesser fraction of the higher frequencies. In the signal processing electronics, sensors 1 and 4 are combined to form a first pair, sensors 2 and 5 form a second pair, and sensors 3 and 6 form a third pair. Thus, it will be noted, a disturbance along the intruder path indicated, will unbalance all three pairs of sensors. It should be evident from FIG. 8 that it is impossible to cross the line at any point without unbalancing at least two of the three pairs of sensors. If an intruder path is chosen at exact midpoint between two sensors of a pair, the output of the subtractive integrator for that pair would be zero, but the same would definitely not be true for the outputs of subtractive integrators associated with the other two pairs of sensors. Based on these observations, which were experimentally verified in the field, the logic following the subtractive integrators 130, 134, and 138 in FIG. 7 begins with three bipolar level detectors 150, 154, and 157.

Referring again to FIG. 7, the signals from each pair of the sensors are processed in the manner discussed previously with reference to FIG. 1. Additional logic circuitry, already discussed previously, is provided to process the signals appearing at the outputs of bipolar level detectors 150, 154, and 157. The logic following these bipolar level detectors implements the following rules:

1. if any two integrators produce a unipolar level detection within a predetermined period of time, the criteria for alarm is satisfied;
2. if any one integrator produces a bipolar level detection during the predetermined time interval, the alarm is inhibited.

As mentioned before, particularly with reference to FIG. 6, a bipolar level detection is produced by a disturbance propagating parallel to the sensor line array, while a unipolar level detection is produced by a disturbance propagating across the line.

EXCLUSIVE OR logic gates 165, 167, and 169 respectively receive signals from bipolar level detectors 150, 154, and 157. Output signals will be produced by the EXCLUSIVE OR gates whenever a signal appears at one of the outputs of its associated bipolar level detector. No signal will appear at the output of the EXCLUSIVE OR gate when a signal appears at neither of the bipolar level detector outputs or at both of its outputs within a predetermined period of time. The outputs of the three EXCLUSIVE OR gates are applied to the inputs of two-of-three detector 175, which will provide an output whenever at least two of three signals are obtained from the EXCLUSIVE OR gates.

The outputs of bipolar level detectors 150, 154, and 157 are further applied, respectively, to inputs of AND gates 166, 168, and 170. Each of these AND gates will provide an output signal whenever signals appear at both outputs of its associated bipolar level detector. The outputs of the three AND gates are applied to OR gate 172, which will provide an output signal whenever it obtains an input from any one of three AND gates. The signal from the output of OR gate 172 is used to inhibit the operation of two-of-three detector 175. Thus, it can be seen that the operation of two-of-three detector 175 will be inhibited whenever signals appear at both outputs of any one of the bipolar level detectors within a predetermined period of time, which is established by system activity timer 173.

The details of a typical system activity timer 173 and two-of-three detector 175 are disclosed in FIG. 12 of the drawing. System activity timer 173 is shown with six inputs for receiving the signals from the six respective outputs of the three bipolar level detectors, as shown in FIG. 7. System activity timer 173 has a first output terminal 268 and a second output terminal 269. The six inputs are each connected, through an associated diode, to an input 261 of a system timer 260 and an input 266 of activity timer 265. The six diodes comprise an OR gate, such that a signal will appear at inputs 261 and 266 of system timer 260 and activity timer 265 whenever a signal appears at any one or more of the bipolar level detector outputs. The output of activity timer 265 is connected to a second input 262 of system timer 260. System timer 260 further has an output connected to the input of an alarm timer 270. Alarm timer 270 has a first output connected to terminal 268 which in turn is connected to the READ input of two-of-three detector 175. A second output of alarm timer 270, inverted with respect to the first, is connected to output terminal 269 through a capacitor 255. A parallel combination of a resistor 256 and a diode 257 are connected between output terminal 269 and a ground, diode 257 being oriented for forward current flow from ground to terminal 269. In the preferred embodiment of the invention, system timer 260 has a time constant of 30 seconds, activity timer 265 has a time constant of 3 seconds, and alarm timer 270 is a ONE-SHOT having a time constant of 1 second.

Two-of-three detector 175 has three inputs 272, 273, and 274, for connection to the outputs of each of the three EXCLUSIVE OR gates, as shown in FIG. 7. Two-of-three detector 175 further has a READ input mentioned above, an INHIBIT input, and an ALARM output. Three AND gates 276, 280, and 284 are provided, each having a pair of inputs and one output. One input of each of the AND gates is connected directly to the READ input. The other inputs of AND gates 276, 280, and 284 are connected to inputs 272, 273, and 274, respectively. The output of AND gate 276 is connected, through a series combination of a diode 277 and a resistor 278, to a common junction point 290. The output of AND gate 280 is connected, through a series combination of a diode 281 and a resistor 282, to the common junction point 290. Likewise, the output of AND gate 284 is connected, through a series path of a diode 285 and a resistor 286, to the common junction point 290. Diodes 277, 281, and 285 are oriented for forward current flow from the outputs of the respective AND gates to common junction point 290 and serve, together with the associated resistors 278, 282, and 286, as a summing network.

A Zener diode 295 is shown, having its cathode connected to common junction point 290 and having its anode connected to the base of a transistor 300. A resistor 296 is connected between the emitter and the base of transistor 300, and a resistor 297 is connected between the emitter of transistor 300 and common junction point 290. The emitter of transistor 300 is further connected to a ground potential terminal. The collector of transistor 300 is connected to a positive potential terminal through a resistor 301 and also directly to an input of a NOR gate 298. NOR gate 298 has a second input connected to the INHIBIT input, and further has an output connected to the ALARM output.

The operation of the system activity timer and the two-of-three detector is as follows. Upon a seismic disturbance within the field of range of the sensors, an output will appear at least at one of the bipolar level detectors and will be applied to the inputs of system timer 260 and activity timer 265. System timer 260 is a ONE-SHOT with a time constant of approximately 30 seconds. It will provide a pulse output every 30 seconds, as long as sufficient disturbances continue to generate signals at its input 261. Activity timer 265 is also a ONE-SHOT, but having a substantially shorter time constant, in the preferred embodiment selected to be about 3 seconds. The function of activity timer 265 is to provide a reset signal to input 262 of system timer 260 whenever more than a three-second interruption occurs between the consecutive pulses generated by a particular disturbance. Upon application of the reset signal to system timer 260, the time period of system timer 260 is cut short and an output pulse is generated instantaneously. The purpose of this is to assure that an alarm output is never generated more than 3 seconds after cessation of the disturbance. In other words, the alarm is always triggered within three seconds or less after an intruder crosses the line.

The output of system timer 260 is applied to the input of alarm timer 270 which is a ONE-SHOT having a time constant of approximately 1 second. Upon application of a pulse to the input of alarm timer 270, a positive going square wave of one second duration will appear at its first output and a negative going square wave of 1 second duration will appear at its second output. The first output of alarm timer 270 is applied to the READ input of two-of-three detector 175. Thus, AND gates 276, 280, and 284 will be enabled for a period of one second by the pulse from alarm timer 270. If output signals appear at EXCLUSIVE OR gates (165, 167, or 169 of FIG. 7), an output will be generated by the AND gate receiving such signal. Zener diode 295 is a threshold detector selected at a level such that it will not conduct if an output is generated by only one of the three AND gates. If an output is generated by at least two of the AND gates, the outputs will be summed and the resulting voltage will exceed the threshold of zener diode 295, resulting in current flow in the base circuit of transistor 300.

The signal from collector of transistor 300 is applied to an input of NOR gate 298. When transistor 300 is turned on and the potential at its collector drops, NOR gate 298 will generate an alarm signal at its output, unless an INHIBIT signal is applied to its second input. The INHIBIT signal will be received from OR gate 172 in FIG. 7 whenever signals appear at both outputs of any one of the three bipolar level detectors.

The signal at the second output of alarm timer 270 is differentiated by capacitor 255. Thus, a positive pulse will be generated at output terminal 269 of system activity timer 173 at the end of the one-second time period of alarm timer 270. This pulse at output terminal 269 is applied to the RESET inputs of bipolar level detectors 150, 154, and 157 of FIG. 7 to reset the system after a disturbance and place it into condition to detect a following intrusion.

The above specification describes the preferred embodiment of the present invention. Clearly, any modifications and variations are possible, without departing from the scope and the spirit of the invention, as will be apparent to those skilled in the art.

What is claimed is:
1. An intrusion sensing apparatus, comprising:
   first and second sensors positioned along a predetermined line, said sensors each providing an output signal the amplitude of which is representative of the amplitude and frequency of disturbance experienced by the sensor;
   a crossing threshold generator connected to receive at its input signals from each of said first and second sensors, said crossing threshold generator being adapted to generate at its output a threshold signal which is a function of the amplitude of the signals provided by said first and second sensors, within the limits of a predetermined maximum and a predetermined minimum;
   a first threshold crossing detector having a first input connected to receive said signal from said first sensor and having a second input connected to receive the threshold signal from the output of said crossing threshold generator, said first threshold crossing detector providing at its output a pulse each time the signal at its input exceeds said threshold signal;
   a second threshold crossing detector having a first input connected to receive said signal from said second sensor and having a second input connected to receive the threshold signal from the output of said crossing threshold generator, said second threshold crossing detector providing at its output a pulse each time the signal at its input exceeds said threshold signal; and
   subtractive integrator means having a pair of inputs for receiving the outputs of said first and second threshold crossing detectors and providing an output signal which is indicative of the difference in the number of pulses appearing at the outputs of said first and second threshold crossing detectors during a predetermined period of time.
2. Apparatus according to claim 1, wherein a bipolar level detector is provided to receive the signal from the output of said subtractive integrator means, said bipolar level detector having a first output for providing a signal when the signal from said subtractive integrator means is positive and having a second output for providing a signal when the signal from said subtractive integrator means is negative.

3. Apparatus according to claim 1, wherein said first and second sensors are geophones.

4. Apparatus according to claim 1, wherein an integrator reset timer is provided to periodically reset said subtractive integrator.

5. An intrusion sensing apparatus, comprising:
first, second, third, fourth, fifth, and sixth sensors arranged sequentially along a predetermined line, said first and fourth sensors forming a first pair, said second and fifth sensors forming a second pair, and said third and sixth sensors forming a third pair, each said sensor providing an output signal the amplitude and frequency of which are representative of the amplitude and frequency of the disturbances experienced by the sensor;
first, second, and third signal processing channels, one said channel associated with each said pair of sensors and including,
a first threshold crossing detector for receiving at its input the signal from one sensor of said pair and a second threshold crossing detector for receiving at its input the signal from the other sensor of said pair, each said threshold crossing detector providing at its output a pulse each time the signal at its input crosses a predetermined amplitude threshold,
subtractive integrator means having a pair of inputs for receiving the outputs of said threshold crossing detectors and providing an output signal which are indicative of the difference in the number of pulses appearing at the outputs of said first and second threshold crossing detectors during a predetermined time interval; and
output means for receiving signals from said subtractive integrator means of each of said three channels to generate an alarm signal whenever a signal appears at the outputs of at least two of said subtractive integrator means.

6. Apparatus according to claim 5, wherein a bipolar level detector is connected in each channel to receive the signal from the output of said subtractive integrator means, said bipolar level detector having a first output for providing a signal when the signal at its input is of a first polarity and having a second output for providing a signal when the signal at its input is of a second polarity; and
output means are provided for receiving signals from said bipolar level detectors of each said three channels to generate an alarm signal whenever a signal appears at one output of at least two of said bipolar level detectors, except when signals appear at both outputs of any one of said bipolar level detectors.

7. Apparatus according to claim 5, wherein said output means further includes:
a first EXCLUSIVE OR gate having first and second inputs connected respectively to said first and second outputs of the bipolar level detector of said first channel, a second EXCLUSIVE OR gate having first and second inputs connected respectively to said first and second outputs of the bipolar level detector of said second channel, and a third EXCLUSIVE OR gate having first and second inputs connected respectively to said first and second outputs of the bipolar level detector of said third channel; and
a two-of-three detector having first, second, and third inputs connected to outputs of said first, second, and third EXCLUSIVE OR gates, respectively, said two-of-three detector further having an output for providing a signal whenever signals are applied to at least two of its three inputs.

8. Apparatus according to claim 5, wherein said output means further includes a first AND gate having first and second inputs for connecting respectively to said first and second outputs of the bipolar level detector of said first channel, a second AND gate having first and second inputs for connecting respectively to said first and second outputs of the bipolar level detector of said second channel, and a third AND gate having first and second inputs for connecting respectively to said first and second outputs of the bipolar level detector of said third channel; and
an OR gate having three inputs for connection to the outputs of said first, second, and third AND gates and having an output connected to said two-of-three detector to prevent the generation of the alarm signal whenever signals appear at both outputs of a bipolar level detector in any one of the three channels.

9. Apparatus according to claim 5, wherein said first, second, third, fourth, fifth, and sixth sensors are geophones.

10. Apparatus according to claim 5, wherein a crossing threshold generator is provided in each channel to generate a threshold signal for said threshold crossing detectors which is a function of the amplitude of the signals generated by the associated pair of the sensors within the limits of a predetermined maximum and a predetermined minimum.

11. Apparatus according to claim 5, wherein an integrator reset timer is provided to periodically reset each of said subtractive integrators.

* * * * *